United States Patent
Barradas et al.

(10) Patent No.: US 9,687,822 B2
(45) Date of Patent: Jun. 27, 2017

(54) PROCESS FOR PREPARING A COBALT-CONTAINING HYDROCARBON SYNTHESIS CATALYST PRECURSOR

(75) Inventors: Sean Barradas, Koppieskraal (ZA); Cornelia Carolina Eloff, Sasolburg (ZA); Jacobus Lucas Visagie, Sasolburg (ZA)

(73) Assignee: SASOL TECHNOLOGY (PROPRIETARY) LIMITED, Johannesburg (ZA)

( * ) Notice: Subject to any disclaimer, the term of this patent is extended or adjusted under 35 U.S.C. 154(b) by 643 days.

(21) Appl. No.: 14/115,753

(22) PCT Filed: Apr. 25, 2012

(86) PCT No.: PCT/IB2012/052069
§ 371 (c)(1),
(2), (4) Date: Nov. 5, 2013

(87) PCT Pub. No.: WO2012/153217
PCT Pub. Date: Nov. 15, 2012

(65) Prior Publication Data
US 2014/0083904 A1    Mar. 27, 2014

(30) Foreign Application Priority Data
May 6, 2011   (ZA) .................. 201103329

(51) Int. Cl.
| | | |
|---|---|---|
| *B01J 23/75* | (2006.01) | |
| *C10G 2/00* | (2006.01) | |
| *B01J 23/89* | (2006.01) | |
| *B01J 35/00* | (2006.01) | |
| *B01J 37/02* | (2006.01) | |
| *B01J 37/08* | (2006.01) | |
| *B01J 37/16* | (2006.01) | |
| *B01J 21/04* | (2006.01) | |
| *B01J 21/12* | (2006.01) | |

(52) U.S. Cl.
CPC ......... *B01J 23/75* (2013.01); *B01J 23/8913* (2013.01); *B01J 35/002* (2013.01); *B01J 35/006* (2013.01); *B01J 37/0207* (2013.01); *B01J 37/08* (2013.01); *B01J 37/088* (2013.01); *B01J 37/16* (2013.01); *C10G 2/32* (2013.01); *C10G 2/332* (2013.01); *B01J 21/04* (2013.01); *B01J 21/12* (2013.01); *B01J 37/0209* (2013.01); *Y02E 50/14* (2013.01)

(58) Field of Classification Search
None
See application file for complete search history.

(56) References Cited

U.S. PATENT DOCUMENTS

| | | | |
|---|---|---|---|
| 4,399,234 A | 8/1983 | Beuther et al. | |
| 4,605,676 A | 8/1986 | Kobylinski et al. | |
| 4,717,702 A | 1/1988 | Beuther et al. | |
| 6,806,226 B2 | 10/2004 | Van Berge et al. | |
| 2010/0152035 A1 * | 6/2010 | Visagie ................... | B01J 23/75 502/325 |

FOREIGN PATENT DOCUMENTS

| | | |
|---|---|---|
| WO | WO02089978 A1 | 11/2002 |
| WO | WO03033137 A1 | 4/2003 |
| WO | WO03035257 A1 | 5/2003 |
| WO | WO2008135939 A2 | 11/2008 |
| WO | WO2010011332 A1 | 1/2010 |
| WO | PCTIB2012052069 | 10/2012 |

* cited by examiner

*Primary Examiner* — Colin W Slifka
(74) *Attorney, Agent, or Firm* — Brinks Gilson & Lione; G. Peter Nichols

(57) ABSTRACT

A process for preparing a cobalt-containing hydrocarbon synthesis catalyst precursor includes calcining a loaded catalyst support comprising a catalyst support supporting a cobalt compound. The calcination includes heating the loaded catalyst support over a heating temperature range of 90° C. to 220° C. using (i) one or more high heating rate periods during the heating over the heating temperature range wherein heating of the loaded catalyst support takes place at a heating rate of at least 10° C./minute, and wherein a gas velocity of at least 5 $m^3_n$/kg cobalt compound/hour is effected over the loaded catalyst support, and (ii) one or more low heating rate periods during the heating over the heating temperature range wherein heating of the loaded catalyst support takes place at a heating rate of less than 6° C./minute. The cobalt compound is thereby calcined, with a cobalt-containing hydrocarbon synthesis catalyst precursor being produced.

20 Claims, No Drawings

PROCESS FOR PREPARING A COBALT-CONTAINING HYDROCARBON SYNTHESIS CATALYST PRECURSOR

FIELD OF THE INVENTION

This invention relates to catalysts. In particular, it relates to a process for preparing a cobalt-containing hydrocarbon synthesis catalyst precursor, to a process for preparing a hydrocarbon synthesis catalyst, and to a process for producing hydrocarbons which includes using the said hydrocarbon synthesis catalyst.

BACKGROUND ART

It is known that supported cobalt-containing Fischer-Tropsch synthesis (FTS) catalysts can be prepared by means of impregnation of a cobalt salt onto a catalyst support coupled with drying of the impregnated support, followed by calcination of the resultant dried impregnated support to obtain a FTS catalyst precursor. The catalyst precursor is then reduced to obtain the FTS catalyst comprising cobalt crystallites dispersed on the support.

It is also known that the manner in which the calcination step is carried out may influence the eventual activity of the catalyst. For example, WO 2010/011332 discloses a method of preparing a supported cobalt containing catalyst with homogeneously dispersed small crystallites. The method comprises depositing cobalt nitrate on a catalyst support and then heating the support in an oxygen containing, substantially water-free, atmosphere to about 160° C. to form an intermediate decomposition product. This intermediate decomposition product is then calcined and reduced to produce the catalyst with homogeneously dispersed small crystallites.

It is known (for example, from WO 2010/011332) that the activity of a cobalt-containing FTS catalyst is proportional to the cobalt particle sizes above 6 nm, and accordingly it is expected that small crystallites and high dispersion thereof will result in improved activity of the catalyst.

U.S. Pat. No. 6,806,226 discloses a cobalt containing catalyst which, during the calcination step, has been calcined in such a manner that all reducible cobalt is of the formula-unit $CoO_aH_b$. It was found that catalysts so prepared had an improved activity.

It has now been found that if, in the preparation of a cobalt containing catalyst, the calcination includes both a high heating rate period which is accompanied by a gas flow at a high space velocity, and a low heating rate period, according to the present invention, a catalyst with small crystallites and/or good activity is obtained.

DISCLOSURE OF THE INVENTION

According to a first aspect of the present invention, there is provided a process for preparing a cobalt-containing hydrocarbon synthesis catalyst precursor, which process includes calcining a loaded catalyst support comprising a catalyst support supporting a cobalt compound, the calcination including heating the loaded catalyst support over a heating temperature range of 90° C. to 220° C. using one or more high heating rate periods during the heating over the heating temperature range wherein heating of the loaded catalyst support takes place at a heating rate of at least 10° C./minute, and wherein a gas velocity of at least 5 $m^3_n$/kg cobalt compound/hour is effected over the loaded catalyst support; and one or more low heating rate periods during the heating over the heating temperature range wherein heating of the loaded catalyst support takes place at a heating rate of less than 6° C./minute, thereby to calcine the cobalt compound, with a cobalt-containing hydrocarbon synthesis catalyst precursor being produced. It should be understood to one of ordinary skill in the art that for the purpose of the present disclosure, the cobalt compound could be a cobalt salt such that the gas velocity could be expressed in cobalt salt/hour.

Calcination

The calcination of the loaded catalyst support may involve decomposing the cobalt compound and/or causing it to react with oxygen. During calcination the cobalt compound, for example, cobalt nitrate, may be converted into a cobalt oxide, preferably, a cobalt oxide selected from CoO, CoO(OH), $Co_3O_4$, $Co_2O_3$ or a mixture of one or more thereof.

The heating over the one or more high heating rate periods may increase the temperature of the loaded catalyst support, i.e. the cobalt compound and the catalyst support, by at least 10° C.; preferably, by at least 20° C.; more preferably, by at least 50° C.; still more preferably, by at least 90° C.

The one or more high heating rate periods may cover the entire heating temperature range of 90° C. to 220° C., in which case the heating rate during the one or more low heating rate periods may be 0° C./min. Alternatively, the one or more high heating rate periods may be carried out to cover only part of the heating temperature range from 90° C. to 220° C., i.e. less than 100% of the heating temperature range of 90° C. to 220° C.

Preferably, the one or more high heating rate periods are carried out over at least 50% of the heating temperature range of 90° C. to 220° C. The said percentage is preferably at least 65%; more preferably at least 75%; and in some preferred embodiments of the invention the percentage may be at least 90%.

Preferably, at least one high heating rate period is directly followed by at least one low heating rate period. In one embodiment of the invention, the calcination may include two or more high heating rate periods with at least one of the high heating rate periods being directly followed by a low heating rate period. Preferably each high heating rate period is directly followed by a low heating rate period.

The one or more low heating rate periods preferably cover the calcination heating temperature range not covered by the high heating rate periods.

The calcination during the one or more high heating rate periods may be carried out in any suitable calcination apparatus. Such calcination apparatus may include a TORBED (trademark) fluidised bed reactor, a horizontal fluid bed calciner, or a microwave heater. Preferably, the calcination apparatus is a TORBED reactor (fluidised bed reactor). It will be appreciated that the heating temperature range of 90° C. to 220° C. refers to the bed temperature, i.e. to the temperature of the loaded catalyst support bed in the reactor or calciner.

It will be appreciated that the calcination may also be carried out above 220° C., for example up to 230° C.; or up to 250° C.; or even up to 270° C. In such a case, the one or more high heating rate periods may be carried out over at least 50% of the whole heating temperature range above 90° C. The said percentage is preferably at least 65%; more preferably at least 75%; and in some preferred embodiments of the invention the percentage may be at least 90%.

The heating rate during the high heating rate period(s) may be at least 15° C./min, and preferably it is at least 20° C./min.

The space velocity of the gas flow during the high heating rate period(s) may be at least 7 $m^3_n$/kg cobalt compound/hour; preferably it is at least 10 $m^3_n$/kg cobalt compound/hour; preferably it is at least 18 $m^3_n$/kg cobalt compound/hour.

The gas used during the calcination may be any suitable gas such as an inert gas or an oxygen containing gas. The inert gas may be nitrogen. The oxygen containing gas may be air.

Preferably, gas flow over the loaded catalyst support is also affected during the low heating rate period. In one embodiment of the invention the space velocity of gas flow during the low heating rate period is below 5 $m^3_n$/kg cobalt compound/hour, preferably it is below 3 $m^3_n$/kg cobalt compound/hour, more preferably it is below 2 $m^3_n$/kg cobalt compound/hour.

In another preferred embodiment of the invention the space velocity of the gas flow during the low heating rate period is at least 5 $m^3_n$/kg cobalt compound/hour, preferably it is at least 7 $m^3_n$/kg cobalt compound/hour; preferably it is at least 10 $m^3_n$/kg cobalt compound/hour, more preferably it is at least 18 $m^3_n$/kg cobalt compound/hour. Preferably the space velocity of the gas flow during the low heating rate period is the same as the space velocity of the gas flow during the high heating rate period.

The heating rate during the at least one low heating rate period may be below 5° C./minute, preferably it is below 3° C./minute. In one embodiment of the invention the said heating rate is about 1° C./minute. In another embodiment of the invention the said heating rate is about 0° C./minute. In a preferred embodiment of the invention the said heating rate is at least 0° C./minute. It will be appreciated that when the said heating rate is at least 0° C./minute, there may also be periods where the heating rate is below 0° C./minute (that is cooling down), but such periods are then not considered to be low heating rate periods.

During calcination of the cobalt compound, it decomposes to produce decomposition gases. For example, where the cobalt compound is $Co(NO_3)_2 \cdot 6H_2O$, decomposition gases in the form of $H_2O$ and $NO_x$ are produced. It has now been found that during the one or more high heating rate periods, the rate of production of the decomposition gases is such that it can result in catalyst precursor particle break-up. It has also surprisingly been found that catalyst precursor particle break-up resulting from the production of decomposition gases during calcination can be reduced by combining one or more low heating rate periods with one or more high heating rate periods. The frequency and/or length of time of the low heating rate periods can be varied in order to reduce catalyst precursor particle break-up.

In one preferred embodiment of the invention at least one low heating rate period is provided in the calcination heating temperature range above 120° C. and preferably below 190° C. Preferably, the said range is above 125° C., more preferably above 145° C., and more preferably it is below 180° C.

In one preferred embodiment of the invention, the calcination may include at least one high heating rate period extending over at least part of a first heating temperature range (preferably from 90 to 180° C.); at least one high heating rate period extending over at least part of a second heating temperature range above the temperature range of the first heating temperature range (preferably above 180° C.); and at least one low heating rate period which is between the high heating rate period in the first temperature range and the high heating rate period in the second temperature range.

In another embodiment of the invention, the calcination may include at least one high heating rate period extending over at least part of a first heating temperature range (preferably from 90 to 125° C.); at least one high heating rate period extending over at least part of a second heating temperature range above the temperature range of the first temperature range (preferably from above 125° C. to 180° C.); at least one high heating rate period extending over at least part of a third heating temperature range above the temperature range of the second temperature range (preferably above 180° C.); at least one low heating rate period which is between the high heating rate period in the first temperature range and the high heating rate period in the second temperature range; and at least one low heating rate period which is between the high heating rate period in the second temperature range and the high heating rate period in the third temperature range.

Preferably, the calcination includes one high heating rate period extending over at least part of the first heating temperature range. Preferably, the calcination includes at least one high heating rate period extending over at least part of the second heating temperature range. Preferably the calcination includes one high heating rate period extending over at least part of the third heating temperature range.

The Catalyst Support

The catalyst support may be any catalyst support suitable for supporting thereon an active catalyst component or a precursor compound of the active catalyst component. The catalyst support is preferably suitable for use as a support in a catalyst for synthesising hydrocarbons and/or oxygenates of hydrocarbons from at least hydrogen and carbon monoxide. Preferably the catalyst is a Fischer-Tropsch (FT) synthesis catalyst. The FT synthesis catalyst may be for a process to be performed in a fixed bed reactor, slurry bed reactor or even a fixed fluidised bed reactor. Preferably the process is to be performed in a three phase slurry bed FT synthesis reactor.

The catalyst support is usually a porous support, and preferably it is also preshaped. The support preferably has an average pore diameter between 8 and 50 nanometers, more preferably between 10 and 15 nanometers. The support pore volume may be between 0.1 and 1 ml/g catalyst support, preferably between 0.3 and 0.9 ml/g catalyst support. The pre-shaped support may be a particulate support, preferably with an average particle size of between 1 and 500 micrometers, more preferably between 10 and 250 micrometers, still more particularly between 45 and 200 micrometers.

The catalyst support may comprise a catalyst support basis and optionally one or more modifying components. The catalyst support basis may be selected from the group consisting of alumina in the form of one or more aluminium oxides; silica ($SiO_2$); titania ($TiO_2$); magnesia (MgO); zinc oxide (ZnO); and mixtures thereof. Preferably the support basis is selected from the group consisting of alumina in the form of one or more aluminium oxides; titania ($TiO_2$) and silica ($SiO_2$). More preferably the support basis is alumina in the form of one or more aluminium oxides. The support basis may be a commercially available product, for example Puralox (trade name)(available from Sasol Germany GmbH).

Preferably the catalyst support includes one or more modifying components. This is particularly the case where the support basis is soluble in a neutral and/or an acidic aqueous solution, or where the support basis is susceptible to hydrothermal attack as described below.

The modifying component may comprise a component that results in one or more of the following:
(i) decreasing the dissolution of the catalyst support in an aqueous environment,
(ii) suppressing the susceptibility of the catalyst support to hydrothermal attack (especially during Fischer-Tropsch synthesis);
(iii) increasing the pore volume of the catalyst support;
(iv) increasing the strength and/or attrition and/or abrasion resistance of the catalyst support.

In a preferred embodiment of the invention the modifying component decreases the dissolution of the catalyst support in an aqueous environment and/or suppresses the susceptibility of the catalyst support to hydrothermal attack (especially during Fischer-Tropsch synthesis). Such an aqueous environment may include an aqueous acid solution and/or an aqueous neutral solution, especially such an environment encountered during an aqueous phase impregnation catalyst preparation step. Hydrothermal attack is considered to be the sintering of the catalyst support (for example aluminium oxide) during hydrocarbon synthesis, especially Fischer-Tropsch synthesis, due to exposure to high temperature and water.

The modifying component may include or consist of Si, Zr, Co, Ti, Cu, Zn, Mn, Ba, Ni, Na, K, Ca, Sn, Cr, Fe, Li, Ti, Sr, Ga, Sb, V, Hf, Th, Ce, Ge, U, Nb, Ta, W, La and mixtures of two or more thereof.

The modifying component may be selected from the group consisting of Si; Zr; Cu; Zn; Mn; Ba; La; W; Ni and mixtures of one or more thereof. Preferably the modifying component is selected from the group consisting of Si and Zr. In a preferred embodiment of the invention the modifying component is Si.

When the modifying component is Si, the silicon level in the resultant catalyst support may be at least 0.06 Si atoms per square nanometer of the catalyst support, preferably at least 0.13 Si atoms pre square nanometer of the catalyst support, and more preferably at least 0.26 Si atoms per square nanometer of the catalyst support.

Preferably the upper level is 2.8 Si atoms/nm$^2$ of the catalyst support.

In one preferred embodiment of the invention the catalyst support comprises a catalyst support basis optionally including a modifying component selected from Si and Zr, and with the catalyst support basis being selected from the group consisting of alumina in the form of one or more aluminium oxides; silica ($SiO_2$) and titania ($TiO_2$). Preferably the catalyst support basis is alumina in the form of one or more aluminium oxides and preferably it includes a modifying component which is preferably selected from Si and Zr, preferably Si. In one preferred embodiment of the invention the catalyst support may be selected from alumina in the form of one or more aluminium oxides, silica ($SiO_2$), titania ($TiO_2$), magnesia (MgO), silica modified aluminium oxide, and mixtures thereof. Preferably the support is a silica modified aluminium oxide, for example the product obtainable under the trademark Siralox from Sasol Germany GmbH. Siralox is a spray-dried silica containing aluminium oxide support. The silica modified aluminium oxide support may be the product described in U.S. Pat. No. 5,045,519 which is incorporated herein by reference.

The one or more aluminium oxides may be selected from the group including (preferably consisting of) gamma alumina, delta alumina, theta alumina and a mixture of two or more thereof. Preferably the group includes, or, preferably, consists of gamma alumina, delta alumina and a mixture of gamma alumina and delta alumina. The aluminium oxide catalyst support may be that obtainable under the trademark Puralox, preferably Puralox SCCa2/150 from SASOL Germany GmbH. Puralox SCCa 2/150 (trademark) is a spray-dried aluminium oxide support consisting of a mixture of gamma and theta aluminium oxide.

The aluminium oxide is preferably a crystalline compound which can be described by the formula $Al_2O_3 \cdot xH_2O$ where $0<x<1$. The term aluminium oxide thus excludes $Al(OH)_3$, and AlO(OH), but includes compounds such as gamma, delta and theta alumina.

The Cobalt Compound Carried on the Catalyst Support

The cobalt compound may comprise a cobalt salt.

The cobalt compound may comprise an organic cobalt compound, but preferably it comprises an inorganic cobalt compound. The inorganic cobalt compound may comprise a cobalt salt, preferably cobalt nitrate, and particularly it may be $Co(NO_3)_2 \cdot 6H_2O$.

A dopant capable of enhancing the reducibility of the active catalyst component may also be provided on the catalyst support. The dopant may be in the form of a dopant compound which is a compound of a metal selected from the group including palladium (Pd), platinum (Pt), ruthenium (Ru), rhenium (Re) and a mixture of one or more thereof. The mass proportion of the metal of the dopant (especially palladium metal or platinum metal) to the cobalt may be from 0.01:100 to 3:100.

In one embodiment of the invention the cobalt compound carried on the catalyst support may be prepared by introducing the cobalt compound onto and/or into the catalyst support. The cobalt compound may be introduced onto and/or into the catalyst support by any suitable manner, but preferably it is by means of impregnation. Preferably the catalyst support is impregnated by the cobalt compound by forming a mixture of the catalyst precursor compound; a liquid carrier for the catalyst precursor compound; and the catalyst support.

The liquid carrier may comprise a solvent for the catalyst precursor compound and preferably the catalyst precursor compound is dissolved in the liquid carrier. The liquid carrier may be water.

The Catalyst Precursor

The cobalt in the catalyst precursor may be a cobalt oxide compound including an oxy hydroxyl compound. The cobalt oxide may be selected from the group consisting of CoO, CoO(OH), $Co_3O_4$, $Co_2O_3$ or a mixture of one or more thereof.

The catalyst precursor may contain cobalt at a loading of from 5 to 70 g Co/100 g catalyst support preferably from 20 to 40 g Co/100 g catalyst support, and more preferably from 25 to 35 g Co/100 g catalyst support.

The cobalt oxide compound may be in the form of particles or crystallites distributed over the support surface.

The hydrocarbon synthesis catalyst precursor may be a Fischer-Tropsch synthesis catalyst precursor.

Catalyst

According to a second aspect of the present invention, there is provided a process for preparing a hydrocarbon synthesis catalyst which includes preparing a catalyst precursor according to the first aspect of the invention and then reducing said catalyst precursor, to obtain the catalyst.

The hydrocarbon synthesis catalyst may be a Fischer-Tropsch synthesis catalyst.

The catalyst precursor is preferably treated with a reducing gas to activate the catalyst precursor. Preferably, the reducing gas is hydrogen or a hydrogen containing gas. The hydrogen containing gas may consist of hydrogen and one or more inert gases which are inert in respect of the active catalyst. The hydrogen containing gas preferably contains at least 90 volume % hydrogen.

The reducing gas may be contacted with the catalyst precursor in any suitable manner. Preferably the catalyst precursor is provided in the form of a bed with the reducing gas being caused to flow through the bed of particles. The bed of particles may be a fixed bed, but preferably it is a fluidised bed and preferably the reducing gas acts as the fluidising medium for the bed of catalyst precursor particles.

The reduction may be carried out at a pressure from 0.6 to 1.5 bar(a), preferably from 0.8 to 1.3 bar(a). Alternatively the pressure may be from 1.5 bar (a) to 20 bar(a). More preferably the pressure is at about atmospheric pressure.

The reduction is preferably carried out at a temperature in excess of 25° C. above that at which the catalyst precursor will be reduced to an active form. Preferably the activation is carried out at a temperature above 150° C., and preferably below 600° C., especially where the active catalyst component is cobalt. Preferably the reduction is carried out at a temperature below 500° C., preferably below 450° C.

During activation the temperature may be varied, and preferably it is increased to a maximum temperature as set out above.

The flow of the reducing gas through the catalyst bed is preferably controlled to ensure that contaminants produced during reduction are maintained at a sufficiently low level. The reducing gas may be recycled, and preferably the recycled reducing gas is treated to remove one or more contaminants produced during reduction. The contaminants may comprise one or more of water and ammonia.

The activation may be carried out in two or more steps during which one or both of the heating rate and the space velocity of the reducing gas is varied.

In one embodiment of the invention the active catalyst may be coated by introducing a mixture of active catalyst particles and a coating medium in the form of molten organic substance, which is at a temperature $T_1$, and which sets or congeals at a lower temperature $T_2$ so that $T_2<T_1$, into at least one mould; and at least partly submerging the mould in a cooling liquid, so as to cool the organic substance down to a temperature $T_3$, where $T_3 \leq T_2$.

Hydrocarbon Synthesis

According to a third aspect of the present invention there is provided a hydrocarbon synthesis process comprising preparing a hydrocarbon synthesis catalyst as set out above and contacting hydrogen with carbon monoxide at a temperature above 100° C. and a pressure of at least 10 bar with the said catalyst in order to produce hydrocarbons and, optionally, oxygenates of hydrocarbons.

The temperature at which the hydrogen is contacted with the carbon monoxide may be from 180° C. to 250° C., preferably from 220° C. to 230° C. The pressure at which the hydrogen is contacted with the carbon monoxide may be from 10 bar to 40 bar.

Preferably the hydrocarbon synthesis process is a Fischer-Tropsch process, more preferably a three phase Fischer-Tropsch process, still more preferably a slurry bed Fischer-Tropsch process for producing a wax product.

The hydrocarbon synthesis process may also include a hydroprocessing step for converting the hydrocarbons and, optionally, oxygenates thereof to liquid fuels and/or chemicals.

The invention extends also to products produced by the hydrocarbon synthesis process of the third aspect of the invention.

The invention will now be further described by means of the following non-limiting examples.

In all the examples hereunder, the catalyst precursors were prepared in the same pilot plant. In all cases, the loaded catalyst support (or cobalt nitrate containing precursor), partially calcined cobalt nitrate containing precursor, etc were at the temperature of the pilot plant when loaded into the feeder hopper of the TORBED reactor (fluidised bed reactor), the rotary calciner, or the fluidised bed calciner. The pilot plant temperature was in the range from 4° C. to 30° C., depending on the season and the weather, and is hereinafter in the examples referred to as 'room temperature'.

EXAMPLE 1 (INVENTIVE) (TORBED REACTOR (FLUIDISED BED REACTOR) EXAMPLE C1313/1 T)

A particulate supported cobalt-based or cobalt-containing Fischer-Tropsch synthesis catalyst precursor, which, on activation, produces a 16 g Co/100 g $Al_2O_3$ proprietary slurry phase Fischer-Tropsch synthesis catalyst of the Applicant, was investigated.

The calcination in this example was executed by means of 3 high heating rate periods and 2 low heating rate periods in the 90 to 220° C. range, all in a TORBED reactor (fluidised bed reactor).

Cobalt Impregnation

A representative batch of this pre-reduced catalyst precursor was specifically prepared as follows: Puralox SCCa, pore volume of 0.48 ml/g, from SASOL Germany GmbH of Uberseering 40, 22297 Hamburg, Germany was modified with silicon (using TEOS in ethanol) such that the final silicon level was between 1.3 mass % Si/g of support. A cobalt nitrate containing precursor (or loaded catalyst support) was prepared by incipient wetness impregnation. 15 kg of the above mentioned silica modified gamma alumina support was impregnated with a solution of 12.1 kg of $Co(NO_3)_2 \cdot 6H_2O$ and 7.2 g of $Pt(NH_3)_4(NO_3)_2$, and stirred at 69° C. for 2 hours.

Calcination of Cobalt Nitrate Containing Precursor

The precursor was calcined in a TORBED reactor (fluidised bed reactor) (Torftech Ltd, Thatcham, RG19,6HW, United Kingdom) by loading the cobalt nitrate containing precursor batch into the feeder hopper. The temperature of the TORBED reactor (fluidised bed reactor) was set at 100° C., the air flow was set at 75 m3·h$^{-1}$ and the vibrator feeder speed was set at 10 kg·h$^{-1}$. After the temperature had stabilized, the valve to the vibrator feeder was opened and the cobalt nitrate containing precursor (at room temperature) was fed by vibration into the TORBED reactor (fluidised bed reactor). The heating rate for the precursor was 22° C./min (i.e. high heating rate period) up to 92° C., while the space velocity was 20 m$^3_n$/kg $Co(NO_3)_2 \cdot 6H_2O$/hour. Thereafter the precursor was treated for about 8 minutes in the TORBED reactor (fluidised bed reactor), while the temperature increased from 92 to 100° C., with a heating rate of 1° C./min (i.e. low heating rate period) and a space velocity of 20 m$^3_n$/kg $Co(NO_3)_2 \cdot 6H_2O$/hour.

The resultant partially calcined cobalt nitrate containing precursor was unloaded from the reactor hopper and cyclone hopper, and placed into the feeder hopper. The temperature of the TORBED reactor (fluidised bed reactor) was set at 150° C., the air flow was set at 75 m3·h$^{-1}$ and the vibrator feeder speed was set at 10 kg·h$^{-1}$. After the temperature had stabilized, the valve to the vibrator feeder was opened and the partially calcined cobalt nitrate containing precursor (at room temperature) was fed by vibration into the TORBED reactor (fluidised bed reactor). The heating rate for the precursor was 39° C./min (i.e. high heating rate period) up to 141° C., while the space velocity was 20 m³ₙ/kg Co(NO₃)₂.6H₂O/hour. Thereafter the precursor was treated for about 11 minutes in the TORBED reactor (fluidised bed reactor), while the temperature increased from 141 to 150° C., with a heating rate of 0.8° C./min (i.e. low heating rate period) and an air space velocity of 20 m³ₙ/kg Co(NO₃)₂.6H₂O/hour The resultant cobalt oxide precursor was unloaded from the reactor hopper and cyclone hopper, and placed into the feeder hopper. The temperature of the TORBED reactor (fluidised bed reactor) was set at 270° C., the air flow was set at 75 m3·h⁻¹ and the vibrator feeder speed was set at 10 kg·h⁻¹. After the temperature had stabilized, the valve to the vibrator feeder was opened and the cobalt oxide precursor (at room temperature) was fed by vibration into the TORBED reactor (fluidised bed reactor). The heating rate for the precursor was 77° C./min (i.e. high heating rate period) up to 255° C., while the space velocity was 20 m³ₙ/kg Co(NO₃)₂.6H₂O/hour. Thereafter the precursor was treated for about 14 minutes in the TORBED reactor (fluidised bed reactor), while the temperature increased from 255 to 270° C., with a heating rate of 1.1° C./m in and a space velocity of 20 m³ₙ/kg Co(NO₃)₂.6H₂O/hour. The resultant particulate supported cobalt-based Fischer-Tropsch catalyst precursor was unloaded from the reactor hopper and cyclone hopper.

EXAMPLE 2 (INVENTIVE) (TORBED REACTOR (FLUIDISED BED REACTOR) EXAMPLE C1316/1 T)

The calcination in this example was executed by means of 4 high heating rate periods and 3 low heating rate periods in the 90 to 220° C. range, all in a TORBED reactor (fluidised bed reactor).

The particulate supported cobalt containing Fischer-Tropsch synthesis catalyst precursor of this example was prepared in a similar manner to that of Example 1, however the calcination of the dried cobalt nitrate containing precursor (or loaded catalyst support) was done as follows:
Calcination of the Cobalt Nitrate Containing Precursor The precursor was calcined in a TORBED reactor (fluidised bed reactor) by loading the cobalt nitrate containing precursor batch into the feeder hopper. The temperature of the TORBED reactor (fluidised bed reactor) was set at 100° C., the air flow was set at 75 m3·h⁻¹ and the vibrator feeder speed was set at 10 kg·h⁻¹. After the temperature had stabilized, the valve to the vibrator feeder was opened and the cobalt nitrate precursor (at room temperature) was fed by vibration into the TORBED reactor (fluidised bed reactor). The heating rate for the precursor was 22° C./min (i.e. high heating rate period) up to 92° C., while the space velocity was 20 m³ₙ/kg Co(NO₃)₂.6H₂O/hour. Thereafter the precursor was treated for about 8 minutes in the TORBED reactor (fluidised bed reactor), while the temperature increased from 92° C. to 100° C., with a heating rate of 1° C./m in (i.e. low heating rate period) and a space velocity of 20 m³ₙ/kg Co(NO₃)₂.6H₂O/hour.

The resultant partially calcined cobalt nitrate containing precursor was unloaded from the reactor hopper and cyclone hopper, and placed into the feeder hopper. The temperature of the TORBED reactor (fluidised bed reactor) was set at 150° C., the air flow was set at 75 m3·h⁻¹ and the vibrator feeder speed was set at 10 kg·h⁻¹. After the temperature had stabilized, the valve to the vibrator feeder was opened and the partially calcined cobalt nitrate containing precursor (at room temperature) was fed by vibration into the TORBED reactor (fluidised bed reactor). The heating rate for the precursor was 39° C./min (i.e. high heating rate period) up to 141° C., while the space velocity was 20 m³ₙ/kg Co(NO₃)₂.6H₂O/hour. Thereafter the precursor was treated for about 11 minutes in the TORBED reactor (fluidised bed reactor), while the temperature increased from 141° C. to 150° C., with a heating rate of 0.8° C./min (i.e. low heating rate period) and a space velocity of 20 m³ₙ/kg Co(NO₃)₂.6H₂O/hour.

The resultant partially calcined cobalt nitrate containing precursor was unloaded from the reactor hopper and cyclone hopper, and placed into the feeder hopper. The temperature of the TORBED reactor (fluidised bed reactor) was set at 170° C., the air flow was set at 75 m3·h⁻¹ and the vibrator feeder speed was set at 10 kg·h⁻¹. After the temperature had stabilized, the valve to the vibrator feeder was opened and the partially calcined cobalt nitrate containing precursor (at room temperature) was fed by vibration into the TORBED reactor (fluidised bed reactor). The heating rate for the precursor was 47° C./min (i.e. high heating rate period) up to 165° C., while the space velocity was 20 m³ₙ/kg Co(NO₃)₂.6H₂O/hour. Thereafter the precursor was treated for about 5 minutes in the TORBED reactor (fluidised bed reactor), while the temperature increased from 165° C. to 170° C., with a heating rate of 1° C./min (i.e. low heating rate period) and a space velocity of 20 m³ₙ/kg Co(NO₃)₂.6H₂O/hour. The resultant cobalt oxide precursor was unloaded from the reactor hopper and cyclone hopper, and placed into the feeder hopper. The temperature of the TORBED reactor (fluidised bed reactor) was set at 270° C., the air flow was set at 75 m3·h⁻¹ and the vibrator feeder speed was set at 10 kg·h⁻¹. After the temperature had stabilized, the valve to the vibrator feeder was opened and the cobalt nitrate precursor (at room temperature) was fed by vibration into the TORBED reactor (fluidised bed reactor). The heating rate for the precursor was 56° C./min (i.e. high heating rate period) up to 248° C., while the space velocity was 20 m³ₙ/kg Co(NO₃)₂.6H₂O/hour. Thereafter the precursor was treated for about 10 minutes in the TORBED reactor (fluidised bed reactor), while the temperature increased from 248° C. to 270° C., with a heating rate of 2.1° C./min and a space velocity of 20 m³ₙ/kg Co(NO₃)₂.6H₂O/hour. The resultant particulate supported cobalt-based Fischer-Tropsch synthesis catalyst precursor was unloaded from the reactor hopper and cyclone hopper.

EXAMPLE 3 (INVENTIVE) (ROTARY CALCINER/TORBED REACTOR (FLUIDISED BED REACTOR) EXAMPLE C1320/1 T)

The calcination in this example was executed by means of 1 low heating rate period in a rotary kiln calciner followed by 1 high heating rate period in a TORBED reactor (fluidised bed reactor), all in the 90° C. to 220° C. range.

The particulate supported cobalt containing Fischer-Tropsch synthesis catalyst precursor of this example was prepared in a similar manner to that of Example 1, however the calcination of the dried cobalt nitrate containing precursor (or loaded catalyst support) was done as follows:
Calcination of Cobalt Nitrate Containing Precursor The precursor was calcined in a rotary calciner by loading the cobalt nitrate containing precursor batch (at room temperature) into the stainless steel calcination tube. The temperature of the rotary calciner was increased by 1° C./min from room temperature to 130° C. and the air flow was low, being obtained by natural convection inside the calcination tube (i.e. low heating rate period).

The resultant partially calcined cobalt nitrate containing precursor was left to cool to room temperature where after the material was further calcined in a TORBED reactor (fluidised bed reactor). The partially calcined cobalt nitrate containing precursor batch was calcined in the TORBED reactor (fluidised bed reactor) by loading the cobalt nitrate containing precursor into the feeder hopper. The temperature of the TORBED reactor (fluidised bed reactor) was set at 270° C., the air flow was set at 75 m3·h$^{-1}$ and the vibrator feeder speed was set at 10 kg·h$^{-1}$. After the temperature had stabilized, the valve to the vibrator feeder was opened and the cobalt nitrate containing precursor (at room temperature) was fed by vibration into the TORBED reactor (fluidised bed reactor). The heating rate for the precursor was 77° C./min up to 255° C., while the space velocity was 20 m$^3{}_n$/kg Co(NO$_3$)$_2$.6H$_2$O/hour (i.e. high heating rate period). Thereafter the precursor was treated for about 14 minutes in the TORBED reactor (fluidised bed reactor), while the temperature increased from 255° C. to 270° C., with a heating rate of 1.1° C./m in and a space velocity of 20 m$^3{}_n$/kg Co(NO$_3$)$_2$.6H$_2$O/hour. The resultant particulate supported cobalt-based Fischer-Tropsch synthesis catalyst precursor was unloaded from the reactor hopper and cyclone hopper.

EXAMPLE 4 (INVENTIVE) (FLUIDISED BED CALCINER/TORBED REACTOR (FLUIDISED BED REACTOR) EXAMPLE C1317/1 T)

The calcination in this example was executed by means of 1 low heating rate period in a fluidised bed calciner followed by 1 high heating rate period in a TORBED reactor (fluidised bed reactor), all in the 90° C. to 220° C. range.

The particulate supported cobalt-containing Fischer-Tropsch synthesis catalyst precursor of this example was prepared in a similar manner to that of Example 1, however the calcination of the dried cobalt nitrate containing precursor (or loaded catalyst support) was done as follows:

Calcination of Cobalt Nitrate Containing Precursor

The precursor was calcined in a fluidised bed calciner by loading the cobalt nitrate containing precursor batch (at room temperature) into the fluidised bed calcination unit. The temperature of the fluidised bed calciner was increased by 1° C./m in from room temperature to 130° C. and the air flow was 2 m$^3{}_n$/kg Co(NO$_3$)$_2$.6H$_2$O/hour (i.e. low heating rate period).

The resultant partially calcined cobalt nitrate containing precursor was left to cool to room temperature where after the material was further calcined in a TORBED reactor (fluidised bed reactor). The partially calcined cobalt nitrate containing precursor was calcined in the TORBED reactor (fluidised bed reactor) by loading the cobalt nitrate containing precursor batch into the feeder hopper. The temperature of the TORBED reactor (fluidised bed reactor) was set at 270° C., the air flow was set at 75 m3·h$^{-1}$ and the vibrator feeder speed was set at 10 kg·h$^{-1}$. After the temperature had stabilized, the valve to the vibrator feeder was opened and the cobalt nitrate precursor (at room temperature) was fed by vibration into the TORBED reactor (fluidised bed reactor). The heating rate for the precursor was 77° C./min up to 255° C., while the space velocity was 20 m$^3{}_n$/kg Co(NO$_3$)$_2$.6H$_2$O/hour (i.e. high heating rate period). Thereafter the precursor was treated for about 14 minutes in the TORBED reactor (fluidised bed reactor), while the temperature increased from 255° C. to 270° C., with a heating rate of 1.1° C./min and a space velocity of 20 m$^3{}_n$/kg Co(NO$_3$)$_2$.6H$_2$O/hour. The resultant particulate supported cobalt-based Fischer-Tropsch synthesis catalyst precursor was unloaded from the reactor hopper and cyclone hopper.

EXAMPLE 5 (COMPARATIVE) (FLUIDISED BED CALCINED EXAMPLE C1212/1 T)

The calcination in this example was executed by means of 1 low heating rate period in a fluidised bed calciner in the 90 to 220° C. range.

The precursor of this example was prepared in a similar manner to that of Example 1.

Calcination of cobalt nitrate containing precursor (or loaded catalyst support) The precursor was calcined in a fluidised bed calciner by loading the cobalt nitrate containing precursor batch into the fluidised bed calcination unit. The temperature of the fluidised bed calciner was increased by 1° C./m in from room temperature to 250° C. and the air flow was 2 m$^3{}_n$/kg Co(NO$_3$)$_2$.6H$_2$O/hour (i.e. low heating rate period). The calcined cobalt oxide containing precursor was left in the calciner to cool to room temperature after which it was unloaded.

EXAMPLE 6 (INVENTIVE) (TORBED REACTOR (FLUIDISED BED REACTOR) EXAMPLE C1338/1 S)

The calcination in this example was executed by means of 3 high heating rate periods and 2 low heating rate periods in the 90 to 220° C. range all in a TORBED reactor (fluidised bed reactor).

The precursor of this example was prepared and calcined in a similar manner to that of Example 1. The Puralox support was modified with aqueous monosilicic acid and contained a higher Si load (1.9%) compared to Example 1 (1.3%).

EXAMPLE 7 (INVENTIVE) (TORBED REACTOR (FLUIDISED BED REACTOR) EXAMPLE C1339/1 S)

The calcination in this example was executed by means of 4 high heating rate periods and 3 low heating rate periods in the 90 to 220° C. range al in a TORBED reactor (fluidised bed reactor).

The precursor of this example was prepared and calcined in a similar manner to that of Example 2.

The Puralox support was modified with aqueous monosilicic acid and contained a higher Si load (1.9%) compared to Example 1 (1.3%).

EXAMPLE 8 (INVENTIVE) (TORBED REACTOR (FLUIDISED BED REACTOR)/FLUIDISED BED CALCINER EXAMPLE C1342/1 S)

The calcination in this example was executed by means of 2 high and 2 low heating rate periods in a TORBED reactor (fluidized bed reactor), followed by 1 low heating period in a fluidised bed calciner, all in the 90° C. to 220° C. range.

The cobalt nitrate containing precursor (or loaded catalyst support) of this example was prepared in a similar manner to that of Example 1.

The Puralox support was modified with aqueous monosilicic acid and contained a higher Si load (1.9%) compared to Example 1 (1.3%).

The calcination of the cobalt nitrate containing precursor was done as follows:

Calcination of Cobalt Nitrate Containing Precursor

The precursor was calcined in a TORBED reactor (fluidised bed reactor) by loading the cobalt nitrate containing precursor batch into the feeder hopper. The temperature of the TORBED reactor (fluidised bed reactor) was set at 100° C., the air flow was set at 75 m3·h$^{-1}$ and the vibrator feeder speed was set at 10 kg·h$^{-1}$. After the temperature had stabilized, the valve to the vibrator feeder was opened and the cobalt nitrate precursor (at room temperature) was fed by vibration into the TORBED reactor (fluidised bed reactor). The heating rate for the precursor was 22° C./min (i.e. high heating rate period) up to 92° C., while the space velocity was 20 m$^3_n$/kg Co(NO$_3$)$_2$.6H$_2$O/hour. Thereafter the precursor was treated for about 8 minutes in the TORBED reactor (fluidised bed reactor), while the temperature increased from 92° C. to 100° C., with a heating rate of 1° C./m in (i.e. low heating rate period) and a space velocity of 20 m$^3_n$/kg Co(NO$_3$)$_2$.6H$_2$O/hour. The resultant partially calcined cobalt nitrate containing precursor was unloaded from the reactor hopper and cyclone hopper, and placed into the feeder hopper.

The temperature of the TORBED reactor (fluidised bed reactor) was set at 150° C., the air flow was set at 75 m3·h$^{-1}$ and the vibrator feeder speed was set at 10 kg·h$^{-1}$. After the temperature had stabilized, the valve to the vibrator feeder was opened and the partially calcined cobalt nitrate containing precursor (at room temperature) was fed by vibration into the TORBED reactor (fluidised bed reactor). The heating rate for the precursor was 39° C./min (i.e. high heating rate period) up to 141° C., while the space velocity was 20 m$^3_n$/kg Co(NO$_3$)$_2$.6H$_2$O/hour. Thereafter the precursor was treated for about 11 minutes in the TORBED reactor (fluidised bed reactor), while the temperature increased from 141° C. to 150° C., with a heating rate of 0.8° C./min (i.e. low heating rate period) and a space velocity of 20 m$^3_n$/kg Co(NO$_3$)$_2$.6H$_2$O/hour. The resultant partially calcined cobalt nitrate containing precursor was unloaded from the reactor hopper and cyclone hopper, and placed into the fluidised bed calciner.

The partially calcined cobalt nitrate containing precursor was calcined in the fluidised bed calciner by loading the cobalt nitrate containing precursor batch into the fluidised bed calcinations unit. The temperature of the fluidised bed calciner was increased by 1° C./m in from room temperature to 250° C. and the air flow was 2 m$^3_n$/kg Co(NO$_3$)$_2$.6H$_2$O/hour (i.e. low heating rate period). The resultant calcined cobalt oxide containing precursor, i.e. particulate supported cobalt-containing Fischer-Tropsch synthesis catalyst precursor, was left to cool to room temperature where after the material was unloaded.

EXAMPLE 9 (INVENTIVE) (TORBED REACTOR (FLUIDISED BED REACTOR)/FLUIDISED BED CALCINER/TORBED REACTOR (FLUIDISED BED REACTOR) CALCINER EXAMPLE C1343/1 S)

The calcination in this example was executed by means of 2 high and 2 low heating rate periods in a TORBED reactor (fluidised bed reactor), followed by 1 low heating rate period in a fluidised bed calciner, and finally another high heating rate period in a TORBED reactor (fluidised bed reactor), all in the 90 to 220° C. range.

The cobalt nitrate containing precursor or loaded catalyst support of this example was prepared in a similar manner to that of Example 1.

The Puralox support was modified with aqueous monosilicic acid and contained a higher Si load (1.9%) compared to Example 1 (1.3%).

The calcination of the cobalt nitrate containing precursor was done as follows:

Calcination of Cobalt Nitrate Containing Precursor

The precursor was calcined in a TORBED reactor (fluidised bed reactor) by loading the cobalt nitrate containing precursor batch into the feeder hopper. The temperature of the TORBED reactor (fluidised bed reactor) was set at 100° C., the air flow was set at 75 m3·h$^{-1}$ and the vibrator feeder speed was set at 10 kg·h$^{-1}$. After the temperature had stabilized, the valve to the vibrator feeder was opened and the cobalt nitrate precursor (at room temperature) was fed by vibration into the TORBED reactor (fluidised bed reactor). The heating rate for the precursor was 22° C./min (i.e. high heating rate period) up to 92° C., while the space velocity was 20 m$^3_n$/kg Co(NO$_3$)$_2$.6H$_2$O/hour. Thereafter the precursor was treated for about 8 minutes in the TORBED reactor (fluidised bed reactor), while the temperature increased from 92° C. to 100° C., with a heating rate of 1° C./m in (i.e. low heating rate period) and a space velocity of 20 m$^3_n$/kg Co(NO$_3$)$_2$.6H$_2$O/hour.

The resultant partially calcined cobalt nitrate containing precursor was unloaded from the reactor hopper and cyclone hopper, and placed into the feeder hopper. The temperature of the TORBED reactor (fluidised bed reactor) was set at 150° C., the air flow was set at 75 m3·h-$^1$ and the vibrator feeder speed was set at 10 kg·h$^{-1}$. After the temperature had stabilized, the valve to the vibrator feeder was opened and the partially calcined cobalt nitrate containing precursor (at room temperature) was fed by vibration into the TORBED reactor (fluidised bed reactor). The heating rate for the precursor was 39° C./min (i.e. high heating rate period) up to 141° C., while the space velocity was 20 m$^3_n$/kg Co(NO$_3$)$_2$.6H$_2$O/hour. Thereafter the precursor was treated for about 11 minutes in the TORBED reactor (fluidised bed reactor), while the temperature increased from 141° C. to 150° C., with a heating rate of 0.8° C./min (i.e. low heating rate period) and a space velocity of 20 m$^3_n$/kg Co(NO$_3$)$_2$.6H$_2$O/hour.

The resultant partially calcined cobalt nitrate containing precursor (at room temperature) was unloaded from the reactor hopper and cyclone hopper, and placed into the fluidised bed calciner. The temperature of the fluidised bed calciner was increased by 1° C./min from room temperature to 160° C. and the air flow was 2 m$^3_n$/kg Co(NO$_3$)$_2$.6H$_2$O/hour (i.e. low heating rate period).

The resultant partially calcined cobalt nitrate containing precursor was thereafter calcined in a TORBED reactor (fluidised bed reactor) by loading the cobalt nitrate containing precursor batch into the feeder hopper. The temperature of the TORBED reactor (fluidised bed reactor) was set at 270° C., the air flow was set at 75 m3·h$^{-1}$ and the vibrator feeder speed was set at 10 kg·h$^{-1}$. After the temperature had stabilized, the valve to the vibrator feeder was opened and the cobalt nitrate precursor (at room temperature) was fed by vibration into the TORBED reactor (fluidised bed reactor). The heating rate for the precursor was 77° C./min up to 255° C., while the space velocity was 20 m$^3_n$/kg Co(NO$_3$)$_2$.6H$_2$O/hour (i.e. high heating rate period). Thereafter the precursor was treated for about 14 minutes in the TORBED reactor (fluidised bed reactor), while the temperature increased from 255° C. to 270° C., with a heating rate of 1.1° C./min and a space velocity of 20 m³ₙ/kg Co(NO₃)₂.6H₂O/hour. The resultant cobalt oxide precursor was unloaded from the reactor and cyclone hopper.

EXAMPLE 10A AND 10B (COMPARATIVE) (FLUIDISED BED CALCINER EXAMPLES C1107/1 T AND C1107/2 T)

The calcination in this example was executed by means of 1 low heating period in a fluidised bed calciner in the 90 to 220° C. range.

Particulate supported cobalt-based Fischer-Tropsch synthesis catalyst precursors, which, on activation, produce a 30 g Co/100 g Al₂O₃ and a 16 g Co/100 g Al₂O₃ proprietary slurry phase Fischer-Tropsch synthesis catalyst of the Applicant, were investigated.

Cobalt Impregnation

First impregnation to obtain a precursor with 16 g Co/100gSupport (Example 10A)

A representative batch of this pre-reduced catalyst precursor was specifically prepared as follows: Puralox SCCa, pore volume of 0.48 ml/g, from SASOL Germany GmbH of Uberseering 40, 22297 Hamburg, Germany was modified with silicon such that the final silicon level was 1.3 mass % Si/g of support. A cobalt nitrate containing precursor was prepared by slurry impregnation. 50.0 g of the above mentioned silica modified gamma alumina support was impregnated with a solution of 50.0 g H₂O, 39.5 g of Co(NO₃)₂.6H₂O and 0.0248 g of Pt(NH₃)₄(NO₃)₂, and dried under increased temperature from 60 to 85° C. and vacuum from 260 to 50 mbar for 6 hours. This precursor was calcined as described below.

Second impregnation to obtain a precursor with 30 g Co/100gSupport (Example 10B)

50.0 g of the calcined first impregnated precursor was used to prepare a precursor containing 30 g Co/100 g Support. The calcined precursor was impregnated with a solution of 50.0 g H₂O, 28.38 g of Co(NO₃)₂.6H₂O and 0.0407 g of Pt(NH₃)₄(NO₃)₂, and dried under increased temperature from 60 to 85° C. and vacuum from 260 to 50 mbar for 6 hours. This precursor was calcined as described below.

Calcination of Dried Cobalt Nitrate Containing Precursor

The dried precursor (at room temperature) was loaded into a fluidised bed calcination unit. Calcination was performed at atmospheric pressure. The air flow was set at 2 m³ₙ/kg Co(NO₃)₂.6H₂O/hour. The temperature was increased by 1° C./min (i.e. low heating rate period) from room temperature to 250° C. and held for 6 hours at 250° C. The calcined precursor was left to cool down to room temperature and unloaded.

EXAMPLE 11A AND 11B (COMPARATIVE) (TORBED REACTOR (FLUIDISED BED REACTOR) CALCINER EXAMPLES C742/1 T AND C742/2 T)

The calcination in this example was executed by means of 1 high heating rate period in a TORBED calciner (TORBED reactor—fluidised bed reactor) in the 90 to 220° C. range.

Particulate supported cobalt-based Fischer-Tropsch synthesis catalyst precursors, which, on activation, produce a 30 g Co/100 g Al₂O₃ and a 16 g Co/100 g Al₂O₃ proprietary slurry phase Fischer-Tropsch synthesis catalyst of the Applicant, were investigated.

Cobalt Impregnation

Example 11A C742/1: First impregnation to obtain a precursor with 16 gCo/100gSupport.

A representative batch of this pre-reduced catalyst precursor was specifically prepared as follows: Puralox SCCa, pore volume of 0.48 ml/g, from SASOL Germany GmbH of Uberseering 40, 22297 Hamburg, Germany was modified with silicon such that the final silicon level was between 0 to 1.9 mass % Si/g of support. A cobalt nitrate containing precursor was prepared by slurry impregnation. 15 kg of the above mentioned silica modified gamma alumina support was impregnated with a solution of 15 kg distilled water, 11.9 kg of Co(NO₃)₂.6H₂O and 7.44 g of Pt(NH₃)₄(NO₃)₂. The temperature of this slurry was increased to 60° C. after which a pressure of 20 kPa(a) was applied. During the first 3 hours of the drying step, the temperature was increased slowly and reached 95° C. after 3 hours. After 3 hours the pressure was decreased to 3-15 kPa(a), and a drying rate of 2.5 m %/h at the point of incipient wetness was used. The complete impregnation and drying step took 9 hours, after which the treated uncalcined cobalt nitrate containing precursor was unloaded. This precursor was calcined as described below.

Second impregnation to obtain a precursor with 30 g Co/100gSupport (Example 11B)

10 kg of the calcined cobalt oxide containing precursor was used to prepare the precursor containing 30 g Co/100 g Support. The calcined precursor was impregnated with a solution of 7.5 kg distilled water, 5.7 kg of Co(NO₃)₂.6H₂O and 8.15 g of Pt(NH₃)₄(NO₃)₂, and dried under increased temperature and vacuum. The temperature of this slurry was increased to 60° C. after which a pressure of 20 kPa(a) was applied. During the first 3 hours of the drying step, the temperature was increased slowly and reached 95° C. after 3 hours. After 3 hours the pressure was decreased to 3-15 kPa(a), and a drying rate of 2.5 m %/h at the point of incipient wetness was used. The complete impregnation and drying step took 9 hours, after which the treated uncalcined precursor containing cobalt nitrate was unloaded. This precursor was calcined as described below.

Calcination of Dried Cobalt Nitrate Containing Precursor

The uncalcined cobalt nitrate containing precursor was calcined in a TORBED reactor (fluidised bed reactor) by loading the cobalt nitrate containing precursor batch into the feeder hopper. The temperature of the TORBED reactor (fluidised bed reactor) was set at 270° C., the air flow was set at 75 m3·h⁻¹ and the vibrator feeder speed was set at 10 kg. h⁻¹. After the temperature had stabilized, the valve to the vibrator feeder was opened and the cobalt nitrate precursor (at room temperature) was fed by vibration into the TORBED reactor (fluidised bed reactor). The heating rate for the precursor was 77° C./min up to 255° C., while the space velocity was 20 m³ₙ/kg Co(NO₃)₂.6H₂O/hour (i.e. high heating rate period). Thereafter the precursor was treated for about 14 minutes in the TORBED reactor (fluidised bed reactor), while the temperature increased from 255° C. to 270° C., with a heating rate of 1.1° C./min and a space velocity of 20 m³ₙ/kg Co(NO₃)₂.6H₂O/hour.

The resultant cobalt-based Fischer-Tropsch synthesis catalyst precursor was unloaded from the reactor hopper and cyclone hopper.

EXAMPLE 12 (INVENTIVE) (TORBED REACTOR (FLUIDISED BED REACTOR) CALCINER EXAMPLE C1118/1 T)

The calcination in this example was executed by means of 2 high and 1 low heating rate periods in a TORBED reactor (fluidised bed reactor), all in the 90 to 220° C. range.

A particulate supported cobalt-based Fischer-Tropsch synthesis catalyst precursor, which, on activation, produces a 16 g Co/100 g $Al_2O_3$ proprietary slurry phase Fischer-Tropsch synthesis catalyst of the Applicant, was investigated.

Cobalt Impregnation

The precursor of this example was prepared in a similar manner to that of Example 11, first impregnation only, to obtain a precursor with 16 g Co/100 g Support. The uncalcined precursor was calcined as follows:

Calcination of Cobalt Nitrate Containing Precursor (or Loaded Catalyst Support)

The precursor was calcined in a TORBED reactor (fluidised bed reactor) by loading the cobalt nitrate containing precursor batch into the feeder hopper. The temperature of the TORBED reactor (fluidised bed reactor) was set at 150° C., the air flow was set at 75 m3·h$^{-1}$ and the vibrator feeder speed was set at 10 kg·h$^{-1}$. After the temperature had stabilized, the valve to the vibrator feeder was opened and the partially calcined cobalt nitrate containing precursor (at room temperature) was fed by vibration into the TORBED reactor (fluidised bed reactor). The heating rate for the precursor was 39° C./min (i.e. high heating rate period) up to 141° C., while the space velocity was 20 m$^3_n$/kg $Co(NO_3)_2.6H_2O$/hour. Thereafter the precursor was treated for about 11 minutes in the TORBED reactor (fluidised bed reactor), while the temperature increased from 141° C. to 150° C., with a heating rate of 0.8° C./min (i.e. low heating rate period) and a space velocity of 20 m$^3_n$/kg $Co(NO_3)_2.6H_2O$/hour.

The resultant partially calcined cobalt nitrate containing precursor was unloaded from the reactor hopper and cyclone hopper, and loaded into the feeder hopper of the TORBED reactor (fluidised bed reactor). The temperature of the TORBED reactor (fluidised bed reactor) was set at 250° C., the air flow was set at 75 m3·h$^{-1}$ and the vibrator feeder speed was set at 10 kg·h$^{-1}$. After the temperature had stabilized, the valve to the vibrator feeder was opened and the cobalt nitrate precursor (at room temperature) was fed by vibration into the TORBED reactor (fluidised bed reactor). The heating rate for the precursor was 70° C./min up to 240° C., while the space velocity was 20 m$^3_n$/kg $Co(NO_3)_2.6H_2O$/hour (i.e. high heating rate period). Thereafter the precursor was treated for about 10 minutes in the TORBED reactor (fluidised bed reactor), while the temperature increased from 240° C. to 250° C., with a heating rate of 1° C./min and a space velocity of 20 m$^3_n$/kg $Co(NO_3)_2.6H_2O$/hour. The resultant particulate supported cobalt-based Fischer-Tropsch synthesis catalyst precursor was unloaded from the reactor hopper and cyclone hopper.

EXAMPLE 13 (INVENTIVE) (TORBED REACTOR (FLUIDISED BED REACTOR) CALCINER EXAMPLE C1149/2 T)

The calcination in this example was executed by means of 3 high and 2 low heating rate periods in a TORBED reactor (fluidised bed reactor), all in the 90° C. to 220° C. range.

A particulate supported cobalt-based Fischer-Tropsch synthesis catalyst precursor, which, on activation, produces a 30 g Co/100 g $Al_2O_3$ proprietary slurry phase Fischer-Tropsch synthesis catalyst of the Applicant, was investigated.

Cobalt Impregnation

The precursor of this example was prepared in a similar manner to that of Example 11, first and second impregnations, to obtain a precursor with 30 g Co/100 g Support. The uncalcined precursor was calcined as follows:

Calcination of dried cobalt nitrate containing precursor (or loaded catalyst support) Calcination after the first impregnation in the TORBED reactor (fluidised bed reactor) was performed in a similar manner to Example 1. Calcination after the second impregnation was performed as follows:

The precursor was calcined in a TORBED reactor (fluidised bed reactor) by loading the cobalt nitrate containing precursor batch into the feeder hopper. The temperature of the TORBED reactor (fluidised bed reactor) was set at 100° C., the air flow was set at 75 m3·h$^{-1}$ and the vibrator feeder speed was set at 10 kg·h$^{-1}$. After the temperature had stabilized, the valve to the vibrator feeder was opened and the cobalt nitrate precursor (at room temperature) was fed by vibration into the TORBED reactor (fluidised bed reactor). The heating rate for the precursor was 22° C./min (i.e. high heating rate period) up to 92° C., while the space velocity was 20 m$^3_n$/kg $Co(NO_3)_2.6H_2O$/hour. Thereafter the precursor was treated for about 8 minutes in the TORBED reactor (fluidised bed reactor), while the temperature increased from 92° C. to 100° C., with a heating rate of 1° C./m in (i.e. low heating rate period) and a space velocity of 20 m$^3_n$/kg $Co(NO_3)_2.6H_2O$/hour.

The resultant partially calcined cobalt nitrate containing precursor was unloaded from the reactor hopper and cyclone hopper, and placed into the feeder hopper. The temperature of the TORBED reactor (fluidised bed reactor) was set at 130° C., the air flow was set at 75 m3·h$^{-1}$ and the vibrator feeder speed was set at 10 kg·h$^{-1}$. After the temperature had stabilized, the valve to the vibrator feeder was opened and the partially calcined cobalt nitrate containing precursor (at room temperature) was fed by vibration into the TORBED reactor (fluidised bed reactor). The heating rate for the precursor was 13° C./min (i.e. high heating rate period) up to 101° C., while the space velocity was 20 m$^3_n$/kg $Co(NO_3)_2.6H_2O$/hour. Thereafter the precursor was treated for about 6 minutes in the TORBED reactor (fluidised bed reactor), while the temperature increased from 101° C. to 130° C., with a heating rate of 5° C./min (i.e. low heating rate period) and a space velocity of 20 m$^3_n$/kg $Co(NO_3)_2.6H_2O$/hour.

The resultant cobalt oxide precursor was unloaded from the reactor hopper and cyclone hopper, and placed into the feeder hopper. The temperature of the TORBED reactor (fluidised bed reactor) was set at 270° C., the air flow was set at 75 m3·h$^{-1}$ and the vibrator feeder speed was set at 10 kg·h$^{-1}$. After the temperature had stabilized, the valve to the vibrator feeder was opened and the cobalt nitrate precursor (at room temperature) was fed by vibration into the TORBED reactor (fluidised bed reactor). The heating rate for the precursor was 77° C./min up to 255° C., while the space velocity was 20 m$^3_n$/kg $Co(NO_3)_2.6H_2O$/hour (i.e. high heating rate period). Thereafter the precursor was treated for about 14 minutes in the TORBED reactor (fluidised bed reactor), while the temperature increased from 255° C. to 270° C., with a heating rate of 1.1° C./m in and a space velocity of 20 m$^3_n$/kg $Co(NO_3)_2.6H_2O$/hour. The resultant particulate supported cobalt-based Fischer-Tropsch synthesis catalyst precursor was unloaded from the reactor hopper and cyclone hopper.

EXAMPLE 14 (INVENTIVE) (TORBED REACTOR (FLUIDISED BED REACTOR) EXAMPLE C1212/2 T)

The calcination in this example was executed by means of 3 high and 2 low heating rate periods in a TORBED reactor (fluidised bed reactor), all in the 90 to 220° C. range.

A particulate supported cobalt-based Fischer-Tropsch synthesis catalyst precursor, which, on activation, produces a 30 g Co/100 g $Al_2O_3$ proprietary slurry phase Fischer-Tropsch synthesis catalyst of the Applicant, was investigated.

The precursor was prepared and calcined in a similar manner to that of Example 1 to obtain a first impregnated and calcined cobalt oxide containing precursor.

To obtain a precursor with 30 g Co/100 g Support prepared by incipient wetness impregnation, 10 kg of the calcined cobalt oxide containing precursor was used. 6.0 kg of $Co(NO_3)_2.6H_2O$ and 7.6 g of $Pt(NH_3)_4(NO_3)_2$ was used to impregnate the calcined cobalt oxide containing precursor and stirred at 69° C. for 2 hours.

Calcination of the cobalt nitrate and cobalt oxide containing precursor after the second impregnation was performed in similar fashion to the calcinations after second impregnation of Example 13.

EXAMPLE 15 (COMPARATIVE) (FLUIDISED BED CALCINED EXAMPLE C1441/1S)

The calcination in this example was executed by means of 1 low heating rate period in a fluidised bed calciner, in the 90 to 220° C. range.

A particulate supported cobalt-based Fischer-Tropsch synthesis catalyst precursor, which, on activation, produces a 16 g Co/100 g $Al_2O_3$ proprietary slurry phase Fischer-Tropsch synthesis catalyst of the Applicant, was investigated.

Cobalt Impregnation

The cobalt nitrate containing precursor was prepared in a similar manner to Example 10A. The precursor was prepared using the same Puralox modified support used for preparation of Example 6.

Calcination of Dried Cobalt Nitrate Containing Precursor

The dried precursor was loaded into a fluidised bed calcination unit. Calcination was performed at atmospheric pressure. The air flow was set at 2 $m^3{}_n$/kg $Co(NO_3)_2.6H_2O$/hour. The temperature was increased by 1° C./m in from room temperature to 250° C. and held for 6 hours at 250° C. The calcined precursor was left to cool down to room temperature and unloaded.

EXAMPLE 16 (COMPARATIVE) (TORBED REACTOR (FLUIDISED BED REACTOR) CALCINER EXAMPLE C1871/1 S)

The calcination in this example was executed by means of 3 high and 2 low heating rate periods in a TORBED reactor (fluidised bed reactor), all in the 90 to 220° C. range.

This example was prepared and calcined in the same manner as Example 13, except that the space velocity was 4.0 $m^3{}_n$/kg $Co(NO_3)_2.6H_2O$/hour during all the heating rate periods.

EXAMPLE 17 (INVENTIVE) (TORBED REACTOR (FLUIDISED BED REACTOR) CALCINER EXAMPLE C1209/1T (6))

The calcination in this example was executed by means of 3 high and 2 low heating rate periods in a TORBED reactor (fluidised bed reactor), all in the 90 to 220° C. range.

This example was prepared and calcined in the same manner as Example 13, except that the space velocity was 7.4 $m^3{}_n$/kg $Co(NO_3)_2.6H_2O$/hour during all the heating rate periods.

EXAMPLE 18 (INVENTIVE) (TORBED REACTOR (FLUIDISED BED REACTOR) CALCINER EXAMPLE C1209/1T (11))

The calcination in this example was executed by means of 3 high and 2 low heating rate periods in a TORBED reactor (fluidised bed reactor), all in the 90 to 220° C. range.

This example was prepared and calcined in the same manner as Example 13, except that the space velocity was 13.8 $m^3{}_n$/kg $Co(NO_3)_2.6H_2O$/hour during all the heating rate periods.

EXAMPLE 19 (INVENTIVE) (TORBED REACTOR (FLUIDISED BED REACTOR) CALCINER EXAMPLE C1209/1T (16))

The calcination in this example was executed by means of 3 high and 2 low heating rate periods in a TORBED reactor (fluidised bed reactor), all in the 90 to 220° C. range.

This example was prepared and calcined in the same manner as Example 13, including using a space velocity of 20 $m^3{}_n$/kg $Co(NO_3)_2.6H_2O$/hour during all the heating periods.

EXAMPLE 20 (INVENTIVE) (TORBED REACTOR (FLUIDISED BED REACTOR)/FLUIDISED BED CALCINER EXAMPLE C1869/1 S)

The calcination in this example was executed by means of 1 high and 1 low heating rate periods in a TORBED reactor (fluidised bed reactor), followed by 1 low heating period in a fluidised bed calciner, all in the 90° C. to 220° C. range.

The cobalt nitrate containing precursor (or loaded catalyst support) of this example was prepared in a similar manner to that of Example 1.

The Puralox support was modified with aqueous silicic acid and contained a higher Si load (1.9% Si) compared to Example 1 (1.3%).

The calcination of the cobalt nitrate containing precursor was done as follows:

Calcination of Cobalt Nitrate Containing Precursor

The precursor was calcined in a TORBED reactor (fluidised bed reactor) by loading the cobalt nitrate containing precursor batch into the feeder hopper. The temperature of the TORBED reactor (fluidised bed reactor) was set at 150° C., the air flow was set at 75 m3·h$^{-1}$ and the vibrator feeder speed was set at 10 kg·h$^{-1}$. After the temperature had stabilized, the valve to the vibrator feeder was opened and the cobalt nitrate precursor (at room temperature) was fed by vibration into the TORBED reactor (fluidised bed reactor). The heating rate for the precursor was 39° C./min (i.e. high heating rate period) up to 141° C., while the space velocity was 20 $m^3{}_n$/kg $Co(NO_3)_2.6H_2O$/hour. Thereafter the precursor was treated for about 11 minutes in the TORBED reactor (fluidised bed reactor), while the temperature increased from 141° C. to 150° C., with a heating rate of 0.8° C./min (i.e. low heating rate period) and a space velocity of 20 $m^3{}_n$/kg $Co(NO_3)_2.6H_2O$/hour. The resultant partially calcined cobalt nitrate containing precursor was unloaded from the reactor hopper and cyclone hopper, and placed into the fluidised bed calciner.

The partially calcined cobalt nitrate containing precursor was calcined in the fluidised bed calciner by loading the cobalt nitrate containing precursor batch into the fluidised bed calcinations unit. The temperature of the fluidised bed calciner was increased by 4° C./min from room temperature to 250° C. and the air flow was 2 m³ₙ/kg Co(NO₃)₂.6H₂O/ hour (i.e. low heating rate period). The resultant calcined cobalt oxide containing precursor, i.e. particulate supported cobalt-containing Fischer-Tropsch synthesis catalyst precursor, was left to cool to room temperature where after the material was unloaded.

EXAMPLE 21 (COMPARATIVE) (TORBED REACTOR (FLUIDISED BED REACTOR)/FLUIDISED BED CALCINER EXAMPLE C1752/1 S)

The calcination in this example was executed by means of 1 high and 1 low heating rate periods in a TORBED reactor (fluidised bed reactor), followed by 1 high heating period (but only slightly above the heating rate required for a low heating rate period) in a fluidised bed calciner, all in the 90° C. to 220° C. range.

The cobalt nitrate containing precursor (or loaded catalyst support) of this example was prepared in a similar manner to that of Example 1.

The Puralox support was modified with aqueous silicic acid and contained a higher Si load (1.9% Si) compared to Example 1 (1.3%).

The calcination of the cobalt nitrate containing precursor was effected in a similar fashion as in Example 20, except that the heating rate in the low heating rate period in the fluidised bed was 7° C./min instead of 4° C./min.

EXAMPLE 22 (XRD ANALYSES)

The calcined samples from Examples 1-21 were subjected to a powdered X ray diffraction analysis as follows:

The samples were packed into stainless steel holders. The Philips X'Pert Pro multi-purpose diffractometer (XRD-2 system) was used to do the analyses. Instrument settings were as follows:
Tube voltage: 40 kV
Tube current: 40 mA
Source: Cobalt (wavelength 1.78897 Å)
Soller slit: 0.04 rad.
Beam mask: 10 mm
Automatic divergence slit Irradiated length: 10 mm
Anti-scatter slit: 2°
Filter: Iron
Detector: X'Celerator
Scan from: 5° 2θ
Scan to: 105° 2θ
Step size: 0.0167° 2θ
Time per step: 150 s
Scan duration: 2 hours X'Pert HighScore Plus software was used to identify the crystalline phases present in the sample. Topas was used for quantitative phase analysis using the fundamental parameter approach. The full pattern refinement technique was used to determine the average crystallite sizes. The sample adsorption was fixed at 10 cm⁻¹.

The average crystallite sizes are listed in Tables 1, 2, 3, 4 and 5.

EXAMPLE 23 (FISCHER-TROPSCH TESTING)

Some of the calcined catalyst precursor samples were subjected to a reduction or activation procedure as follows: In a fluidised bed (20 mm internal diameter) reduction unit, the calcined cobalt oxide containing precursor was reduced, at atmospheric pressure, utilizing an undiluted H₂ reducing gas as total feed gas at a space velocity of 13.7 m³ₙ per kilogram reducible cobalt per hour, whilst applying the following temperature program: heat from 25° C. to 425° C. at 1° C./min, and hold isothermally at 425° C. for 10 hours. After cooling down, the reduced catalyst was loaded into molten wax under an inert atmosphere to protect the sample from oxidizing. The precursor was thus thereby transformed into a corresponding catalyst.

The reduced and wax coated catalyst sample was loaded in a micro slurry reactor and tested for Fischer-Tropsch synthesis performance using the following procedure: The catalyst was evaluated in a laboratory scale reactor under FTS conditions (230° C., 17.5 bar_g pressure, H₂:CO inlet ratio of 1.6:1 for catalysts and at synthesis gas conversions of 60±5%).

The results are reported in Table 1.

EXAMPLE 24 (PSD ANALYSES)

The particle size distribution of the catalyst precursor samples after the last calcination step was analyzed by means of a commercially available Saturn DigiSizer™ 5200. This was done for Examples 10A, 10B, 11A, 11B, 12, 13, 14, 20 and 21.

The percentage of fine material smaller than 45 micron in the catalyst precursor is presented in Table 1 and Table 5.

TABLE 1

Percentage of fines in catalyst precursor, Co₃O₄ crystallite size and relative FT activity for samples of the composition
30 gCo/0.075 gPt/1.3 gSi/100 gAl₂O₃(10B, 11B, 13, 14) and
16 gCo/0.075 gPt/1.3 gSi/100 gAl₂O₃ (10A, 11A, 12).

| Example No | Sample Name | Fines <45 μm (%) | Co₃O₄ (Å) | Relative FT activity | FT run number |
|---|---|---|---|---|---|
| 10A (comp) | C1107/1 T | 1.1 | 128 | 100 | BJ049 |
| 11A (comp | C742/1 T | 12.4 | 88 | — | — |
| 12 (inv) | C1118/1 T | 4.3 | 60 | 114 | BJ048 |
| 10B (comp) | C1107/2 T | 2.0 | 170 | 100 | BJ052 |
| 11B (comp) | C742/2 T | 9.1 | 118 | 124 | 705F |
| 13 (inv) | C1149.2 T | 2.5 | 100 | 131 | BK057 |
| 14 (inv) | C1212/2 T | 1.1 | 120 | 143 | CE044 |

(NOTE: The relative FT activities for Examples 10A and 12 are relative to that of Example 10A, while the relative FT activities for Examples 10B, 11B, 13 and 14 are relative to that of Example 10B.)

(NOTE: The relative FT activities for Examples 10A and 12 are relative to that of Example 10A, while the relative FT activities for Examples 10B, 11B, 13 and 14 are relative to that of Example 10B.)

Table 1 shows that with the catalyst preparation process according to the invention a cobalt FT catalyst is produced that has an increased FT activity, smaller Co₃O₄ crystallites (i.e. in the catalyst precursor) with little breaking up the catalyst precursor in the calcination process. It also shows that in general an increased FT activity is accompanied by a decrease in the Co₃O₄ crystallite size.

In more detail, comparative catalyst examples 10A and 10B, which were produced in a one step process with a low heating rate and low gas space velocity, showed that few catalyst fines were produced, however the catalyst activity of 100 was relatively low for both examples. A Co₃O₄ size for example 10A of 128 Å is large (i.e. for a 16 g Co/100 g Al₂O₃ catalyst) and compares well to the relatively low activity.

Comparative catalyst example 11B, which was produced by a one step process with a high heating rate and a high gas space velocity, showed significantly improved catalyst activity of 124, while a large amount of catalyst fines was produced. $Co_3O_4$ sizes for examples 11A and 11B of 88 and 118 Å respectively are small (i.e. for a 16 g Co/100 g $Al_2O_3$ and 30 g Co/100 g $Al_2O_3$ catalyst respectively) and compares well to the relatively high activity.

Inventive catalyst example 12 and 14, which were produced by a process using 2 high and 1 low heating rate periods, showed significantly improved catalyst activities of 114 and 143 respectively, and only a small amount of catalyst fines were produced. $Co_3O_4$ sizes for examples 12 and 14 of 60 and 120 Å respectively are small (i.e. for a 16 g Co/100 g $Al_2O_3$ and 30 g Co/100 g $Al_2O_3$ catalyst respectively) and compares well to the relatively high activity.

Inventive catalyst example 13, which was produced by a process using 3 high and 2 low heating rate periods, showed a significantly improved catalyst activity of 131, and only a small amount of catalyst fines were produced. A $Co_3O_4$ size for example 13 of 100 Å is small (i.e. for a 30 g Co/100 g $Al_2O_3$ catalyst respectively) and compares well to the relatively high activity.

TABLE 2

$Co_3O_4$ crystallite size for samples of the composition 16 gCo/0.04 gPt/1.3 gSi/100 gAl$_2$O$_3$

| Example No | Sample Name | $Co_3O_4$ (Å) |
|---|---|---|
| 1 | C1313/1 T | 80 |
| 2 | C1316/1 T | 80 |
| 3 | C1320/1 T | 110 |
| 4 | C1317/1 T | 110 |
| 5 (comp) | C1212/1 T | 130 |
| 10A (comp) | C1107/1 T | 128 |

Table 2 shows that with the catalyst preparation process according to the invention cobalt FT catalysts (i.e. examples 1-4) are produced that contain smaller $Co_3O_4$ crystallites (i.e. in the catalyst precursor). These Examples were all prepared by means of a process using a combination of at least one high and at least one low heating rate period. In the light of the observed relationship between $Co_3O_4$ crystallite size and FT activity in Table 1, the examples in Table 2 with smaller crystallites will also have increased FT activity.

TABLE 3

$Co_3O_4$ crystallite size for samples of the composition 16 gCo/0.04 gPt/1.9 gSi/100 gAl$_2$O$_3$

| Example No | Sample Name | $Co_3O_4$ (Å) |
|---|---|---|
| 6 | C1338/1 S | 140 |
| 7 | C1339/1 S | 110 |
| 8 | C1342/1 S | 140 |
| 9 | C1343/1 S | 120 |
| 15 (comp) | C1441/1 S | 150 |

Examples 6-9 were all prepared by means of a process using a combination of at least one high and at least one low heating rate period. These examples resulted in a catalyst with a $Co_3O_4$ crystallite size of between 110 and 140 Å, which is smaller than the comparative example 15, which was prepared by means of a one step process. The smaller $Co_3O_4$ sizes will result in a catalyst with improved FT activity, while the combination of high and low heating rate periods will ensure that only few amounts of catalyst fines will be produced.

TABLE 4

$Co_3O_4$ crystallite size for samples of the composition 16 gCo/0.04 gPt/1.9 gSi/100 gAl$_2$O$_3$

| Example No | Sample Name | SV* | $Co_3O_4$ (Å) |
|---|---|---|---|
| 16 (comp) | C1871/1 S | 4.0 | 120 |
| 17 | C1209/1 T (6) | 7.4 | 97 |
| 18 | C1209/1 T (11) | 13.8 | 99 |
| 19 | C1209/1 T (16) | 20 | 98 |

*SV is in $m^3_n$/kg Co(NO$_3$)$_2$·6H$_2$O/hour

Table 4 shows that when using a space velocity of less than 5 $m^3_n$/kg Co(NO$_3$)$_2$.6H$_2$O)/hour, an undesired high cobalt crystallite size is obtained.

TABLE 5

$Co_3O_4$ crystallite size for samples of the composition 16 gCo/0.04 gPt/1.9 gSi/100 gAl$_2$O$_3$

| Example No | Sample Name | SV* | HR (° C./min) | $Co_3O_4$ (Å) | Fines <45 μm (%) |
|---|---|---|---|---|---|
| 20 | C1869/1 S | 2 | 4 | 140 | 1.5 |
| 21 (comp) | C1752/1S | 2 | 7 | 140 | 2.6 |

*SV is in $m^3_n$/kg Co(NO$_3$)$_2$·6H$_2$O/hour

Table 5 shows that when the heating rate is in excess of 6° C./min for the low heating rate, the catalyst particle start to break-up: 2.6% fines compared to 1.5% fines for the sample with a heating rate of 4 C/m in.

The invention claimed is:

1. A process for preparing a cobalt-containing hydrocarbon synthesis catalyst precursor, which process includes calcining a loaded catalyst support comprising a catalyst support supporting a cobalt salt to decompose the cobalt salt and/or to cause the cobalt salt to react with oxygen, the calcination thereby converting the cobalt salt into a cobalt oxide, the calcination including heating the loaded catalyst support over a heating temperature range of 90° C. to 220° C. using
   one or more high heating rate periods during the heating over the heating temperature range wherein heating of the loaded catalyst support takes place at a heating rate of at least 10° C./minute, and wherein a gas flow with a space velocity of at least 5 $m^3_n$/kg cobalt salt/hour is effected over the loaded catalyst support; and
   one or more low heating rate periods during the heating over the heating temperature range wherein heating of the loaded catalyst support takes place at a heating rate of less than 6° C./minute, thereby to calcine the cobalt salt, with a cobalt-containing hydrocarbon synthesis catalyst precursor being prepared.

2. The process according to claim 1, wherein the heating over the one or more high heating rate periods increases the temperature of the loaded catalyst support by at least 10° C.

3. The process according to claim 1, wherein the one or more high heating rate periods covers only part of the heating temperature range from 90° C. to 220° C.

4. The process according to claim 3, wherein the one or more high heating rate periods is carried out over at least 50% of the heating temperature range of 90° C. to 220° C.

5. The process according to claim 1, which employs two or more high heating rate periods, with at least one of the high heating rate periods being directly followed by a low heating rate period.

6. The process according to claim 1, wherein the one or more low heating rate periods covers the heating temperature range not covered by the high heating rate period(s).

7. The process according to claim 1, wherein the calcination is also carried out above 220° C., with the one or more high heating rate periods being carried out over at least 50% of the whole heating temperature range above 90° C.

8. The process according to claim 1, wherein the heating rate during the high heating rate period(s) is at least 15° C./min.

9. The process according to claim 1, wherein the space velocity of the gas flow during the high heating rate period(s) is at least 10 $m^3_n$/kg cobalt salt/hour.

10. The process according to claim 1, wherein gas flow over the loaded catalyst support is also affected during the one or more low heating rate periods.

11. The process according to claim 10, wherein the space velocity of the gas flow during the low heating rate period(s) is at least 5 $m^3_n$/kg cobalt salt/hour.

12. The process according to claim 11, wherein the space velocity of the gas flow during the low heating rate period(s) is the same as the space velocity of the gas flow during the high heating rate period(s).

13. The process according to claim 1, wherein the heating rate during the low heating rate period(s) is less than 5° C./minute.

14. The process according to claim 1, wherein at least one low heating rate period is provided in the heating temperature range above 120° C. and below 190° C.

15. The process according to claim 1, which employs at least one high heating rate period extending over at least part of a first heating temperature range; at least one high heating rate period extending over at least part of a second heating temperature range above the temperature range of the first heating temperature range; and at least one low heating rate period which is between the high heating rate period in the first temperature range and the high heating rate period in the second temperature range.

16. The process according to claim 1, which employs at least one high heating rate period extending over at least part of a first heating temperature range; at least one high heating rate period extending over at least part of a second heating temperature range above the temperature range of the first temperature range; at least one high heating rate period extending over at least part of a third heating temperature range above the temperature range of the second temperature range; at least one low heating rate period which is between the high heating rate period in the first temperature range and the high heating rate period in the second temperature range; and at least one low heating rate period which is between the high heating rate period in the second temperature range and the high heating rate period in the third temperature range.

17. A process for preparing a hydrocarbon synthesis catalyst which includes preparing a catalyst precursor according to claim 1 and then reducing the said catalyst precursor, to obtain the catalyst.

18. The process according to claim 17, wherein the hydrocarbon synthesis catalyst is a Fischer-Tropsch synthesis catalyst.

19. A hydrocarbon synthesis process comprising preparing a hydrocarbon synthesis catalyst as claimed in claim 17 and contacting hydrogen with carbon monoxide at a temperature above 100° C. and a pressure of at least 10 bar with the catalyst in order to produce hydrocarbons and, optionally, oxygenates of hydrocarbons.

20. The process according to claim 19, which includes a hydroprocessing step for converting the hydrocarbons and, optionally, oxygenates thereof to liquid fuels and/or chemicals.

* * * * *